US007114650B2

(12) United States Patent
Sherrod

(10) Patent No.: US 7,114,650 B2
(45) Date of Patent: Oct. 3, 2006

(54) RETAIL PRODUCTS STORAGE AND DISPENSING APPARATUS AND METHOD

(76) Inventor: George L. Sherrod, 6715 Hawk Pride Mountain Rd., Tuscumbia, AL (US) 35674

( * ) Notice: Subject to any disclaimer, the term of this patent is extended or adjusted under 35 U.S.C. 154(b) by 0 days.

(21) Appl. No.: 11/107,097

(22) Filed: Apr. 15, 2005

(65) Prior Publication Data

US 2005/0178831 A1 Aug. 18, 2005

Related U.S. Application Data

(63) Continuation of application No. 10/336,354, filed on Jan. 3, 2003, now abandoned.

(60) Provisional application No. 60/345,237, filed on Jan. 4, 2002.

(51) Int. Cl.
*G06F 7/08* (2006.01)

(52) U.S. Cl. .................................................... 235/381

(58) Field of Classification Search ................ 235/381, 235/383, 375, 380, 384, 385; 186/2, 38, 186/45, 59, 60–69; 705/16, 14, 17, 1; 340/572, 340/571

See application file for complete search history.

(56) References Cited

U.S. PATENT DOCUMENTS 3,624,792 A 11/1971 Lipfert
4,645,036 A 2/1987 Nestler
5,215,213 A 6/1993 Nestler et al.
5,351,186 A 9/1994 Bullock et al.
5,407,050 A 4/1995 Takemoto et al.
5,816,443 A 10/1998 Bustos
5,902,984 A 5/1999 Planke
5,992,570 A 11/1999 Walter et al.
6,038,492 A * 3/2000 Nichols et al. ............. 700/232
6,189,790 B1 2/2001 Walter
6,213,395 B1 * 4/2001 Dejaeger et al. ............ 235/383
6,356,794 B1 3/2002 Perin et al.
6,497,362 B1 * 12/2002 Persky et al. ............... 235/383
6,523,741 B1 2/2003 DiMaria et al.
2002/0095343 A1 * 7/2002 Barton et al. ................. 705/16

* cited by examiner

*Primary Examiner*—Thien M. Le
*Assistant Examiner*—Thien T. Mai
(74) *Attorney, Agent, or Firm*—Luedeka, Neely & Graham PC

(57) ABSTRACT

To improve space utilization at checkout counters, some preferred embodiments of the present invention employ a retail product storage and dispensing device located beneath the check-out counter. In this manner, areas beneath check-out counters that were previously either empty, occupied by support structure, or otherwise under-utilized are converted into valuable retail space. The under-counter storage and dispensing device of the present invention preferably transfers retail items from beneath the check-out counter to a position above or beside the check-out counter at which the retail items can be taken by a user. The check-out counter can have a dispenser opening through which the retail items can be dispensed or otherwise presented to a user. In some embodiments, the check-out counter also includes a user-manipulatable control panel for selection of products to be dispensed by the under-counter storage and dispensing device.

2 Claims, 22 Drawing Sheets

RETAIL PRODUCTS STORAGE AND DISPENSING APPARATUS AND METHOD

CROSS-REFERENCE TO RELATED APPLICATION

This application is a continuation of application Ser. No. 10/336,354, filed Jan. 3, 2003 now abandoned, and entitled “Retail Product Storage And Dispensing Apparatus And Method”, which claims priority on U.S. Provisional Application No. 60/345,237, filed Jan. 4, 2002, by George L. Sherrod and entitled “Retail Product Storage And Dispensing Apparatus”.

FIELD OF THE INVENTION

The present invention relates to retail product storage and dispensing equipment and methods, and more particularly to equipment and methods for storing and dispensing retail products at check-out counters.

BACKGROUND OF THE INVENTION

As is well known to those in the product display, retail, and sales industries, retail space is extremely valuable to retail outlets. For example, the aisles or lanes normally located adjacent to check-out counters (in grocery and convenience stores, gas stations, retail stores, and other locations where any type of retail product is purchased) are particularly valuable locations at which merchants, manufacturers, and distributors can advertise their products. The time spent by customers at and near check-out counters provides merchants, manufacturers, and distributors a valuable opportunity to display and advertise their products. This fact is well-recognized by the display, retail, and sales industries as demonstrated by the manner in which retail products and advertisements normally occupy most or all available space near check-out counters.

However, the aggressive utilization of space around check-out counters is at odds with a characteristically underutilized part of the check-out counter area: the space typically existing beneath check-out counters. In other words, the optimization of space in display racks, stands, shelves, and cabinets is in stark contrast to the lack of space optimization normally existing beneath check-out counters a small distance away.

The space under existing check-out counters is typically either empty or is occupied only by check-out counter support structure. Although mechanical conveyor system equipment and electronics can also be located beneath some check-out counters, these elements normally do not occupy a significant amount of under-counter space.

This discord between the current space utilization adjacent to existing check-out counters and lack of space utilization beneath check-out counters is compounded by the need for merchants to have sufficient product inventory at check-out counters. This inventory occupies valuable space around check-out counters, despite the fact that a small fraction (and in some cases, only one) of each product is needed or used for display and advertising to customers. In addition, product dispensing equipment often used near check-out counters also occupies a substantial amount of valuable space. For example, automatic product dispensing machines and vending machines typically have motors, mechanisms, housings, and other elements that occupy space that could otherwise be more efficiently used for product display and advertising.

In light of the problems and limitations described above, a need exists for an apparatus and method for dispensing retail products in which space at check-out counters is maximized, space beneath check-out counters is better utilized, and in which excess inventory of retail products does not occupy valuable display space. Each preferred embodiment of the present invention achieves one or more of these results.

SUMMARY OF THE INVENTION

To improve the utilization of space at check-out counters in locations where retail products are purchased, some preferred embodiments of the present invention employ a retail product storage and dispensing device located beneath the check-out counter. In this manner, areas beneath check-out counters that were previously either empty, occupied by support structure, or otherwise under-utilized are converted into valuable retail space capable of being leased to or used by vendors. Utilizing the space under a check-out counter increases the amount of retail space owned by the retail outlet, and therefore increases the amount of retail space capable of being leased to or used by vendors or otherwise used to advertise and display products to purchasers. This is especially important at check-out counters where product visibility is at its highest and impulse purchases can increase sales dramatically.

The storage and dispensing device under the check-out counter preferably transfers retail items from beneath the check-out counter to a position above or beside the check-out counter at which the retail items can be taken by a user (e.g. a cashier, a purchaser, and/or a bagger). The check-out counter can have a dispenser opening through which the retail items can be dispensed or otherwise presented to a user.

In some embodiments, the check-out counter also includes a control panel that has user-manipulatable controls for selection of products to be dispensed by the under-counter storage and dispensing device. By manipulating the buttons, retail items corresponding to the manipulated buttons can be transferred from one or more storage areas within the under-counter storage and dispensing device to a position relative to the check-out counter at which the items can be removed by a user as described above.

If desired, one or more disabling controls can be employed in order to secure the storage and dispensing device against unauthorized dispensing of retail products (e.g., to disable the user-manipulatable controls from operation by a minor in the case of dispensing tobacco products, to disable the storage and dispensing device after store hours, and the like). Alternatively or in addition, controls can be included to monitor and store data regarding operation and dispensing of the under-counter storage and dispensing device.

Due to the transformation of under-counter space to valuable retail space, the amount of retail space owned by a retail outlet increases, and the amount of retail space capable of being leased to or used by vendors increases. Not only is a new area of space available for storage and dispensing equipment (and the retail products stored therein), but valuable space around the check-out counter is freed by transferring products to such under-counter storage and dispensing equipment. Therefore, it will be appreciated that retail outlets can increase revenues by increasing the amount of retail space leased to or used by vendors. Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments that are still within the spirit and scope of the present invention.

In the drawings, wherein like reference numerals indicate like parts.

DETAILED DESCRIPTION OF THE PREFERRED EMBODIMENTS

Figure 1:
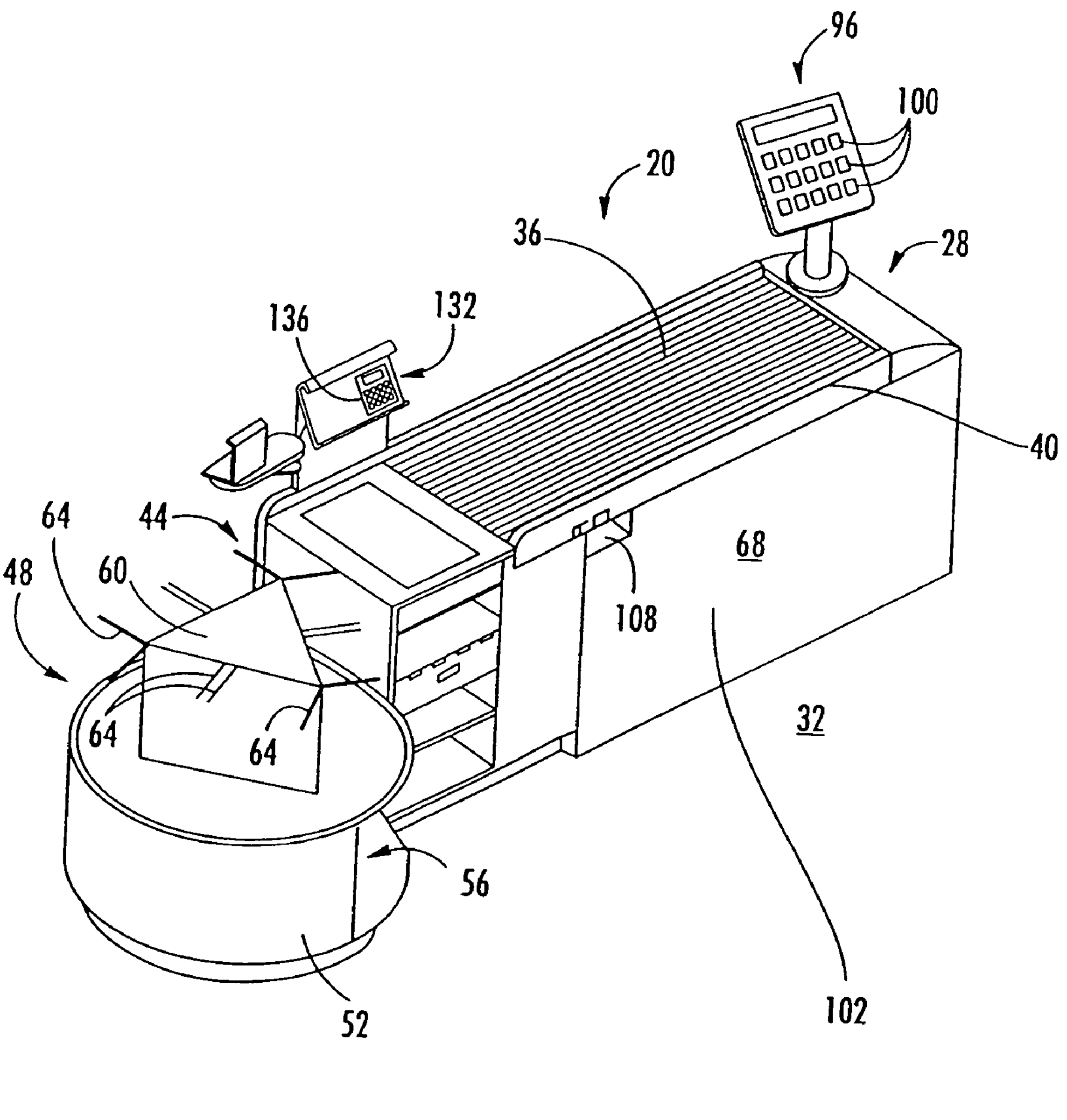
FIG. 1 is a perspective view of an apparatus according to a preferred embodiment of the present invention.

With reference first to FIG. 1, a preferred embodiment of the present invention is illustrated with a conveyor type check-out station. The check-out station shown in FIG. 1 is suitable for use in any retail outlet environment. As used herein, the term “retail outlet” means any location where a party can select one or more items, have those items “checked out” by an employee at the retail outlet, and purchase the items. Examples of retail outlets include without limitation grocery stores, gas stations, convenience stores, liquor stores, and tobacco stores.

Current check-out counters exist in substantially all retail outlets and come in a variety of sizes, shapes, styles, and orientations. Typically, such check-out counters are supported at least partially upon a ground surface and have a space thereunder. Check-out counters can be in the form of a table or other elevated surface that can be flat, ramped, or can have both flat and ramped portions. Alternatively or in addition, check-out counters can include one or more conveyor belts, tabletop conveyors, turnstiles, or other types of conveyors for moving a purhaser’s selected products along the check-out counter.

The space under existing check-out counters of all types is often occupied by check-out counter support structure or is empty. In either case, the space under existing check-out counters is normally not used to store retail products ready for consumer selection and/or purchase. As is well known to those in the product display, retail, and sales industries, retail space is extremely valuable to retail outlets. Typically, as much retail space as possible is leased to or used by vendors or is otherwise used to advertise and display products to purchasers. This is especially true at check-out counters where product visibility is at its highest and impulse purchases can increase sales dramatically. Therefore, it will be appreciated that retail outlets can increase revenues by increasing the amount of retail space leased to or used by vendors.

The check-out counter 20 in the present invention enables space under the check-out counter 20 to be used to store retail products for dispensing to a consumer. Although a number of different types of retail products can be stored for dispensing in accordance with the present invention (as will be described in greater detail below), the embodiment of the present invention illustrated in the figures is adapted to store and dispense cigarette packages 24 (see FIG. 3). Specifically, retail product space is significantly increased in the present invention by storage of cigarette packages beneath the check-out counter 20 for dispensing to customers. In this manner, the formerly unused or underutilized space beneath the checkout counter 20 is employed as retail space. Space that cigarette packages 24 occupied prior to being positioned under the check-out counter 20 in this manner can now be leased to or used by vendors selling other products (or still other cigarettes). Revenues for the retail outlets greatly increase by facilitating the use of space under the check-out counter 20 as well as space previously occupied by cigarettes. As mentioned above, the check-out counter 20 shown in the figures (and described in greater detail below) is representative of a large number of check-out counter types utilized in retail outlets. The present invention is not limited to the particular check-out counter configuration shown in the figures, but rather could be practiced with check-out counters having any size, shape, style, or orientation.

The check-out counter 20 in the illustrated preferred embodiment includes an unloading station 28 supported upon a ground surface 32. The unloading station 28 preferably includes a conveyor belt 36 positioned on a top surface 40 of the unloading station 28. Preferably, customers can place items they have selected to purchase upon the conveyor belt 36, which moves the items along the unloading station 28 toward a cashier’s station and/or to a bagging station 48. The conveyor belt 36 can be powered in any conventional manner. The driving element or system used to power the conveyor belt 36 can be housed within the unloading station 28 or can be external with respect thereto. As mentioned above, the check-out counter can have other types of conveyor(s) as desired, and in some embodiments has no conveyor. In either case, the conveyor and other surfaces of the unloading station 28 can be partially or entirely ramped.

In some embodiments of the present invention, the check-out counter 20 includes a scanning station 44 positioned downstream from the unloading station 28. In the illustrated embodiment, the scanning station 44 is supported upon the ground surface 32 and is connected to the unloading station 28. Items are preferably moved along the unloading station 28 toward the scanning station 44, where the items are passed over the scanning station 44 and are registered into a computer or cash register (not shown). Other types of scanning stations can be used as desired. For example, the scanning station can be defined by a scanner connected to a part of the unloading station 28, a free-standing scanner to or past which items are moved, a hand-held scanner, a scanner positioned above the unloading station to or past which items are moved, and the like.

Some embodiments of the check-out counter 20 according to the present invention also preferably include a bagging station 48 at which items can be bagged. The bagging station 48 can be supported on the ground surface 32, by another part of the check out counter 20, or in any other manner desired. In addition, the bagging station 48 can be in any location with respect to the scanning station 44 (if used) and the unloading station 28. In some preferred embodiments such as that shown in the figures, the bagging station 48 is located downstream of the unloading and scanning stations 28, 44.

In the illustrated preferred embodiment, the bagging station 48 includes a base 52 having a bag storage receptacle 56 defined therein for supporting and storing bags (not shown). In other embodiments, the bagging station 48 can have a stand, pedestal, or base with or without a storage area for bags. Preferably, the bagging station 48 includes a bag holder 60 for holding closed and/or open bags in preparation for bagging of items. The bag holder 60 can take a number of different forms, including without limitation a rack, one or more arms, and the like. The bag holder 60 in the illustrated preferred embodiment has a plurality of bag supports 64 that can hold excess bags in a closed orientation and cam support bags in an open orientation. In some embodiments, the bag holder 60 is rotatable or otherwise movable to different positions to allow a user (e.g. a cashier, bagger, or customer) to place items into the bags and then rotate the bag holder 60. For example, bags can be filled on the bag holder 60, after which time a cashier can rotate the bag holder 60 to present the bagged items to a customer.

Other types of bagging stations can be employed in the present invention, including without limitation straight, curved, C or L-shaped bagging stations with or without a conveyor (e.g., a conveyor belt), non-movable bagging stations connected to the scanning station 44 or unloading station 28, free-standing bagging stations adjacent to the scanning station 44 or unloading station 28, and bagging stations having one or more rollers, inclined surfaces, and the like for supporting and/or helping to transport items to or from the bagging station 48.

In some preferred embodiments of the present invention, the check-out counter 20 includes a cigarette package storage and dispensing device 68 positioned thereunder. In the illustrated preferred embodiment, the storage and dispensing device 68 is positioned under the check-out counter 20 in the unloading station 28 of the check-out counter 20. Alternatively, the storage and dispensing device 68 can be placed under the scanning station 44 (if used) and under the bagging station 48 (if used). In some embodiments, the storage and dispensing device 68 can be located beneath any combination of the unloading station 28, the scanning station 44, and the bagging station 48 rather than being located solely beneath one of these stations.

Preferably, the storage and dispensing device 68 is dimensioned and designed to be received beneath a large number of existing check-out counters in retail outlets. Alternatively, the storage and dispensing device 68 can be dimensioned and designed to be received within one or more particular types of unloading, scanning, or bagging stations (e.g., one or more stations having a particular internal style, size, and/or shape). In still other embodiments, the storage and dispensing device 68 can be integral with an unloading, scanning, or bagging stations or can otherwise be manufactured as a part of any such station.

Figure 2:
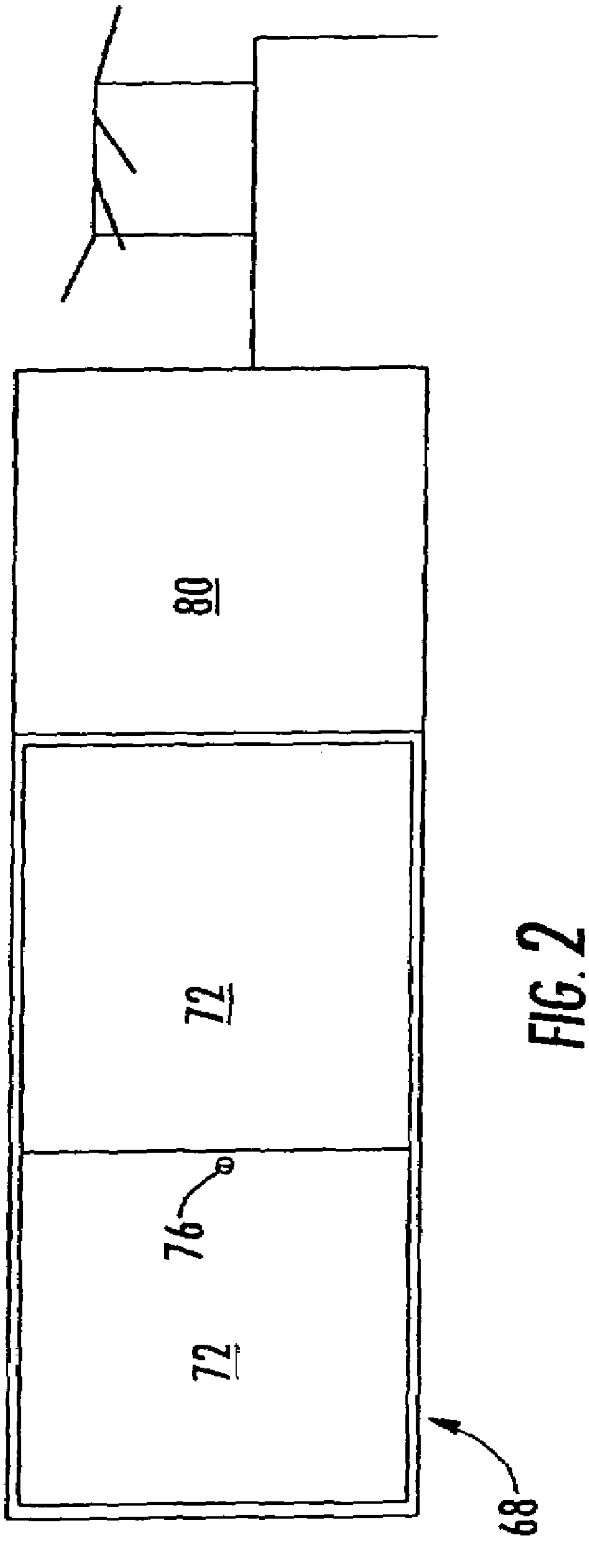
FIG. 2 is a front perspective view of the apparatus illustrated in FIG. 1, shown with access doors in a closed position.
Figure 3:
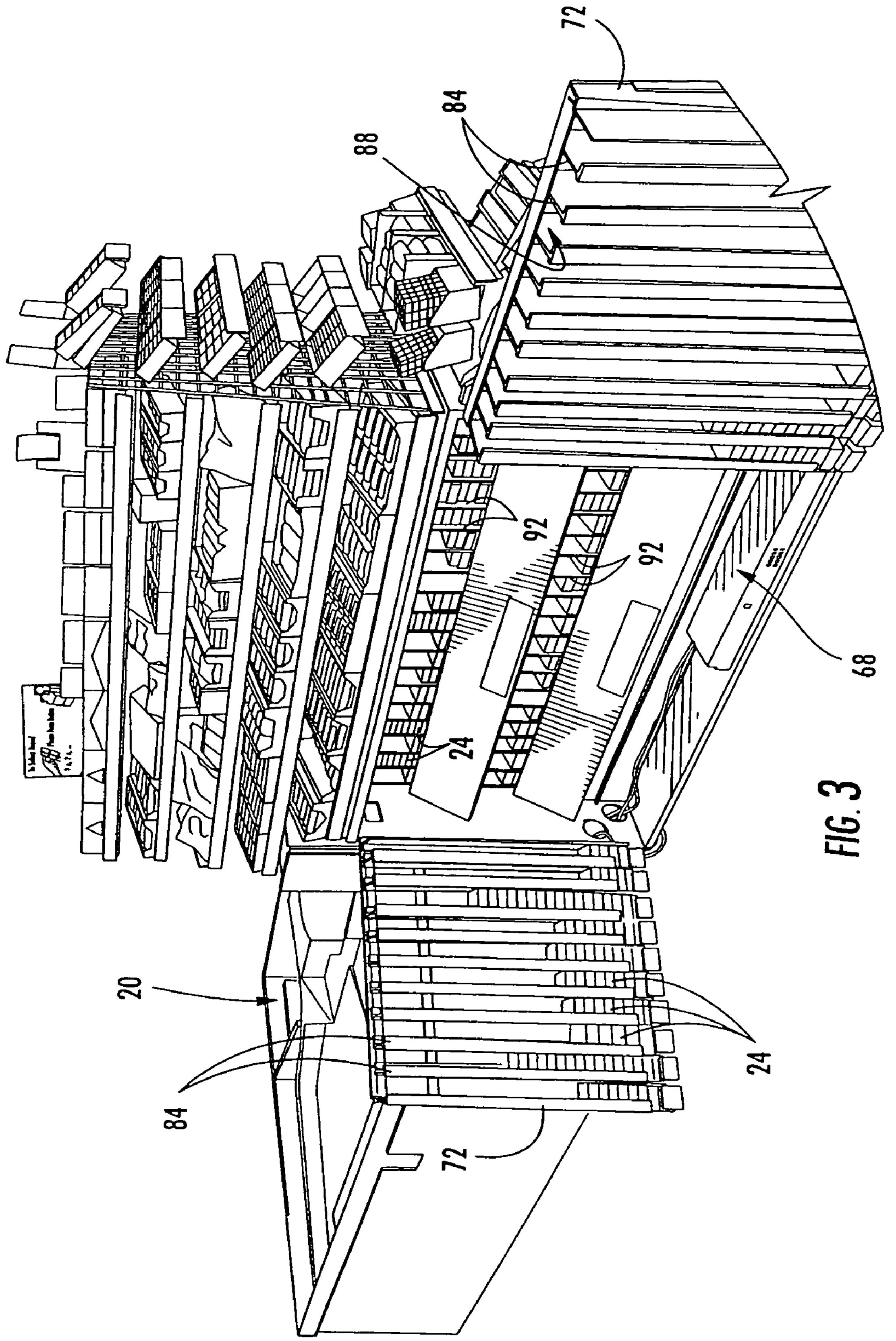
FIG. 3 is a front perspective view of the apparatus illustrated in FIGS. 1 and 2, shown with access doors in an open position.

Referring to FIGS. 2 and 3, the storage and dispensing device 68 preferably includes access doors 72 that allow a user (e.g., a cashier, stock person, delivery person, and the like) to access the interior of the storage and dispensing device 68. Any number of access doors 72 can be provided as desired. The storage and dispensing device 68 can be locked in any manner. For example, in the illustrated preferred embodiment, the access doors 72 include a key lock 76 for securing the interior of the storage and dispensing device 68 against unauthorized access. Other types of locks can be used, including without limitation combination locks and keycard locks.

The access doors 72 in the illustrated preferred embodiment are pivotally mounted on the storage and dispensing device 68 about vertical axes, and can rotate between a closed position (see FIG. 2) and an open position (see FIG. 3). In other embodiments, the access doors 72 can be rotated about different axes, such as horizontal or slanted axes. In still other embodiments, other door types can be employed. For example, access to the interior of the storage and dispensing device 68 can be through one or more sliding doors, roll or slat-type doors, folding doors, and the like.

In the illustrated preferred embodiment, the access doors 72 are positioned on a side of the storage and dispensing device 68 facing customers at the check-out counter 20. However, it should be noted that the access doors 72 can be located on any side of the storage and dispensing device 68, such as on a side facing a cashier, on an end of the storage and dispensing device 68, on a top side thereof, and the like. The location of the access door(s) 72 preferably depends at least partially upon the preferences of the user and upon the check-out counter set-up and orientation. In some embodiments, the storage and dispensing device 68 has no doors, and instead has one or more access openings or panels that can be removed for access to the interior of the storage and dispensing device 68.

The storage and dispensing device 68 is preferably adapted to receive and retain a plurality of cigarette packages 24. One having ordinary skill in the art will appreciate that a number of different devices, elements, and structures exist for performing these functions, any one of which can be employed within the storage and dispensing device 68 of the present invention. Accordingly, each such device, element, and structure falls within the spirit and scope of the present invention. In some highly preferred embodiments, the storage and dispensing device 68 has a plurality of vertical columns within which cigarette packages are retained and stored until dispensed. These vertical columns can be located anywhere within the storage and dispensing device 68. By way of example only, vertical door columns 84 are attached to the interior surfaces 88 of the access doors 72 in the illustrated preferred embodiment, and a plurality of vertical interior columns 92 are supported within the device 68 beneath the check-out counter 20. Alternatively, the storage and dispensing device 68 can be provided with either the vertical door columns 84 or the vertical interior columns 92.

The columns 84, 92 in the interior and connected to the door of the storage and dispensing device 68 can be adapted to dispense cigarette packages in any manner known to those skilled in the art, such as by a kicker mechanism, conveyor, picker, slide, or other ejector driven by any actuation device (e.g., motor, solenoid, hydraulic or pneumatic piston, magnetic rail, and the like). If desired, some of the columns 84, 92 can be used for storing cigarette packages 24 to be manually removed by a user as need, such as to stock dispensing columns 84, 92 provided with actuation devices as just described.

Both the door and interior columns 84, 92 preferably retain a plurality of cigarette packages 24. Preferably, the door and interior columns 84, 92 can be adjusted to receive and retain varying sizes of cigarette packages. In the illustrated preferred embodiment, the door and interior columns 84, 92 are accessible for refilling by opening the doors 72. Cigarette packages 24 are preferably loaded into the door and interior columns 84, 92 from the top and dispensed from the bottom of the door and interior columns 84, 92. This insures that the cigarette packages 24 are dispensed in a first-in, first-out manner to prevent cigarette packages 24 from remaining in the storage and dispensing device 68 for an extended period of time. Although a first-in, first-out loading and dispensing arrangement is most preferred, the cigarette packages 24 can be loaded and unloaded with respect to the door and interior columns 84, 92 in any other manner desired.

One having ordinary skill in the art will appreciate that other manners of loading and dispensing cigarette packages 24 from receptacles or other storage areas within the storage and dispensing device 68 are possible, and depend at least partially upon the element, device, or structure employed to receive and retain the cigarette packages 24. Each of these storage and dispensing alternatives falls within the spirit and scope of the present invention.

Figure 4:
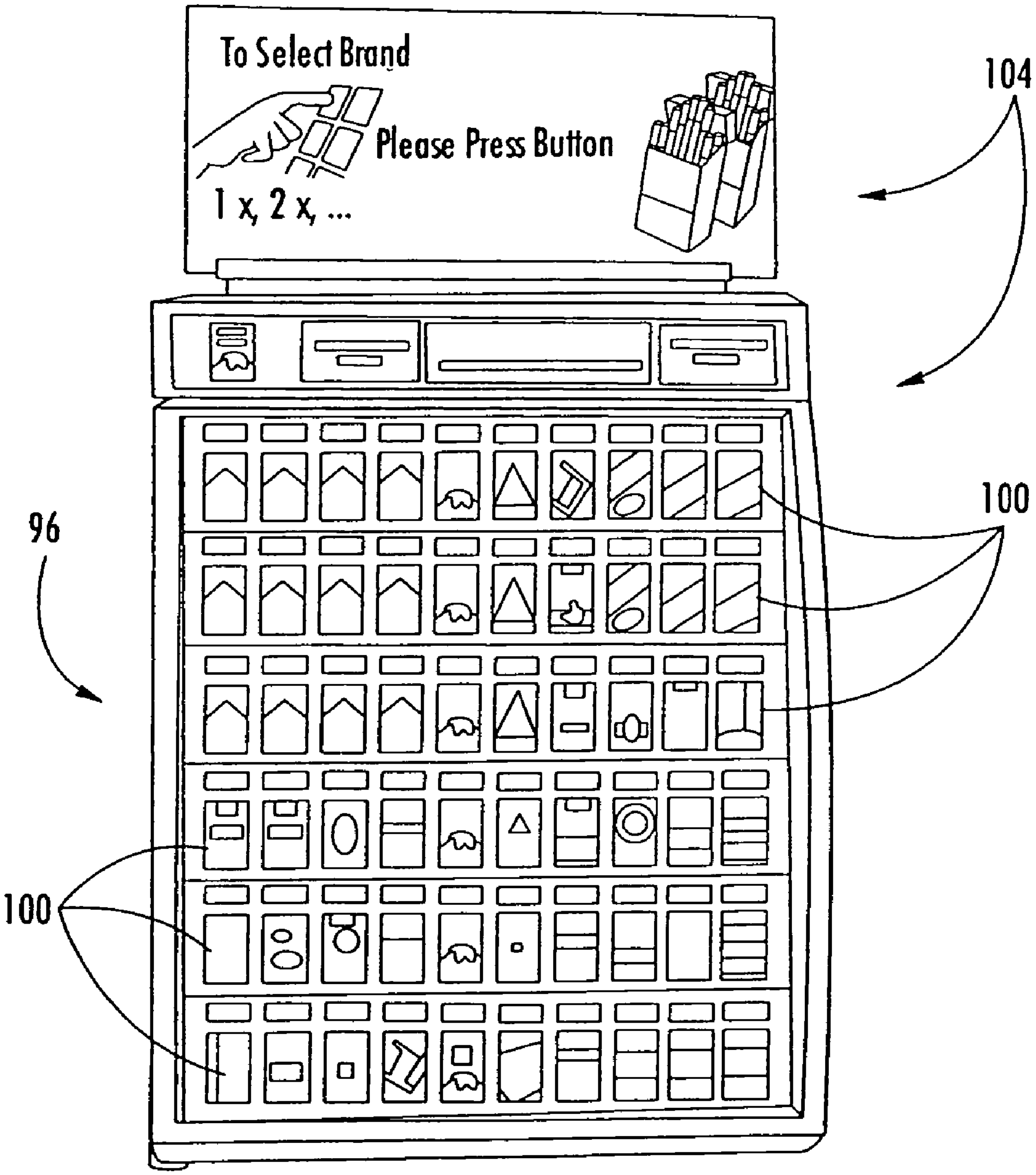
FIG. 4 is a front perspective view of a customer control panel according to a preferred embodiment of the present invention.

Referring now to FIGS. 1 and 4, the storage and dispensing device 68 is preferably connected to a customer interface or select panel 96 (hereinafter "control panel") that allows a customer to select desired brands of cigarettes or other product available for dispensing by the storage and dispensing device 68. Although not required to practice the present invention, the control panel 96 provides higher visibility to cigarette products for sale at the check-out counter 20 and can save significant time in the process of cigarette purchasing. In the illustrated preferred embodiment, the control panel 96 is mounted upon the check-out counter 20. However, the control panel 96 can instead be mounted in any other location at or near the check-out counter 20. By way of example only, the control panel 96 can be mounted to a nearby or adjacent retail rack, a cash register, a base or framework associated with the check-out counter 20, support structure extending from the ceiling, and the like.

The control panel 96 preferably includes or is connected to a controller for the storage and dispensing device 68. The controller (not shown) is preferably electronic, and can include a computer, microprocessor, discrete logic circuitry, or any other form capable of receiving and processing commands from a user and controlling components of the storage and dispensing device 68 needed to transport and dispense cigarette packages 24. Such controllers, their manner of connection to cigarette package conveying devices, and their manner of operation are well known to those skilled in art and are not therefore described further herein.

The control panel 96 preferably includes a plurality of buttons 100 that are operably connected with the plurality of door and interior columns 84, 92. Each button 100 preferably corresponds with at least one door column 84 or interior column 92, and in some preferred embodiments corresponds with a single door column 84 or interior column 92. When one of the buttons 100 is pushed a single time, a single cigarette package 24 from the corresponding door or interior column 84, 92 is preferably ejected from that column's inventory of cigarette packages 24. Preferably, the button 100 can be pressed as many times as there are cigarette packages 24 desired by a party.

In some embodiments of the present invention, two or more storage and dispensing devices 68 are employed for the same check-out counter 20, whether to store and dispense the same or different types of products (e.g., cigarette packages 24). In those embodiments having two or more storage and dispensing devices 68, each storage and dispensing device 68 can have a dedicated control panel 96. Alternatively, the same control panel 96 can be connected to two or more storage and dispensing devices 96. In such cases, the control panel 96 can be operatively connected to dispense a selected type of cigarette package 24 located in one of the storage and dispensing devices 68 connected to the control panel 96. When a door or interior column 84, 92 is empty, the storage and dispensing device 68 preferably dispenses nothing or dispenses a cigarette package 24 from another door or interior column 84, 92.

In addition to providing an interface by which cigarette packages 24 can be selected for dispensing, the control panel 96 can also be used to advertise products or services. Specifically, the control panel 96 can include one or more spaces 104 for product advertisements. For example, vendors can pay the retail outlets to rent the space(s) 104 on the control panel 96, thereby giving the retail outlet an additional source of revenue. In the illustrated preferred embodiment, the space 104 on the control panel 96 supports simple advertisements, such as paper or plastic advertising labels, stickers, cards, film, or any other advertisement media located in any position on or adjacent to the control panel 96 (e.g., on a border of the control panel 96, extending from an edge of the control panel 96, and the like).

In other embodiments, the space 104 can include advertisements that are lit in any manner, or can include one or more display screens for displaying text and/or graphics. If desired, such advertisements and displays can be responsive to one or more of the buttons 100 on the control panel 96 (such as by lighting, flashing, displaying stationary or moving text, symbols, or graphics, and the like). By way of example only, when a certain button 100 is depressed on the control panel 96, a viewing screen can display an advertisement corresponding to the button 100 depressed on the select panel 96. Alternatively or in addition, such advertisements and displays can operate independently of control panel operation by a user. Any type of advertisement and advertisement display media or device can be employed with the control panel 96 of the present invention.

Although the control panel 96 is described above as having a plurality of buttons 100 thereon, the control panel can instead (or in addition) have any other type of user-manipulatable control, including without limitation one or more switches, dials, and the like. In some embodiments, the control panel 96 includes a touch-sensitive screen and/or a voice activated system for receiving commands from a user to dispense a type of cigarette package 24.

As discussed above with respect to the illustrated preferred embodiment, depressing one of the buttons 100 on the select panel 96 preferably causes a cigarette package 24 to be ejected from a corresponding door or interior column 84, 92. Preferably, the cigarette package 24 is transferred from the door or interior column 84, 92 to a position adjacent to a cashier at the check-out counter 20. This transportation of the cigarette package 24 from the door or interior column 84, 92 to the position adjacent to the cashier is performed by one or more conventional cigarette package conveying devices (not shown). As is well known to those skilled in the art, such devices include without limitation belt, tabletop, chain, bucket, and other types of conveyors, vacuum conveyor assemblies, and the like. Any type of package conveying device can be utilized alone or in combination with one or more other package conveying devices of the same or different type.

By way of example only, some or all of the door and interior columns 84, 92 can be provided with actuators as described above to eject the bottom-most cigarette package 24 from each door and interior column 84, 92. When ejected, the cigarette packages 24 can fall to a conveyor (not shown) running at the bottom of the storage and dispensing device 68. As mentioned above, this conveyor can be of any type, and preferably transports the ejected cigarette packages 24 to a vertical conveyor (also not shown) in the storage and dispensing device 68. This vertical conveyor can be any type of conveyor capable of lifting items vertically, such as bucket conveyors, paddle conveyors, and the like, and preferably transports the cigarette packages 24 from the bottom conveyor in the storage and dispensing device 68 to an elevated position at which the vertical conveyor dumps, releases, ejects, or otherwise discharges the cigarette packages 24 to one or more surfaces at or near the top of the storage and dispensing device 68. These surfaces can be part of yet another conveyor, can be ramped, or can be shaped in any manner to transport cigarette packages 24 from the vertical conveyor (not shown) to a user-accessible location at which users can remove the cigarette packages 24. Alternatively, the location at which the vertical conveyor (not shown) discharges cigarette packages 24 can itself be user-accessible, thereby obviating the need for moving cigarette packages 24 further.

Cigarette package conveying devices and assemblies and their manner of operation are well known to those skilled in the art and are not therefore described further herein. In this regard, it should be noted that the various storage and dispensing device 68 components described above can be replaced in whole or in part by a number of different existing cigarette package storage and dispensing devices employed in other applications and environments. By way of example only, existing cigarette vending machine components and systems can be employed in the under-counter system of the present invention, as well as components and systems found in other types of vending machines (such as candy and soda vending machines).

Referring again to FIG. 1, the storage and dispensing device 68 preferably dispenses the cigarette package 24 toward a cashier station (at which a cashier stands or sits adjacent to the check-out counter 20). Such a cashier station is indicated generally at 102, and is preferably a dedicated area providing cashier access to a cash register (not shown), items on the check-out counter 20, and to the bagging station 48. The cashier station 102 can be located at any position adjacent to the check-out counter 20, but is preferably located on a side of the check-out counter 20 opposite the position(s) where customers of the retail outlet stand. In other words, at least part of the check-out counter 20 preferably at least partially separates the customer from the cashier. However, other check-out counter arrangements are possible in which the cashier station 102 is located in any position with respect to traffic areas, customer stations, and the various stations 24, 44, 48 of the check-out counter 20.

In some preferred embodiments (such as the illustrated preferred embodiment), the storage and dispensing device 68 includes a dispenser opening 108 defined in the unloading station 28 on the cashier side of the check-out counter 20. The cigarette packages 24 pulled from the inventory of the door and interior columns 84, 92 are preferably transferred to the dispenser opening 108 where the cashier can pick up the cigarette packages 24 in order to price, scan, and/or bag the cigarette packages 24. In some embodiments, the control panel 96 is connected to the cash register or computer (not shown) operated by the cashier in order to automatically communicate the type and/or number of cigarette packages 24 dispensed from the storage and dispensing device 68 to the computer or cash register. This information can be sent from the storage and dispensing device 68 to the computer or cash register by suitable communications wiring, cable, or wireless transmission, and can eliminate the need for the cashier to scan or key in the type and price of the cigarette packages 24 dispensed.

The dispenser opening 108 in the illustrated preferred embodiment is defined in a wall of the unloading station 28. However, in other embodiments the dispenser opening 108 can be located in any other surface of the unloading station 28, including a top surface, a surface adjacent to and/or facing toward the cashier station 102, and a surface located adjacent to and/or facing a location where customers stand or pass the check-out counter 20. The dispenser opening 108 can be defined in a wall of the unloading station 28 or can be defined in a housing, extension, or other enclosure attached to or integral with the unloading station 28. In other embodiments, the dispenser opening 108 is located in another part of the check-out counter 20, such as in the scanning station 44 or in the bagging station 48. In such embodiments, the conveyor(s) transporting cigarette packages from the door or interior columns 84, 92 extends to the dispensing opening 108, and can extend into and through one or more other stations beneath the check-out counter 20 for this purpose.

In some cases, it may be desirable to dispense items toward the cashier rather than toward the customer at the check-out counter 20. In the illustrated preferred embodiment for example, cigarette packages 24 are preferably dispensed toward the cashier's station 102 for increased transaction control over such regulated products. In other cases, it may be desirable to dispense items in other directions and in other locations of the check-out counter, such as to a location at or adjacent to a cash register, toward and on the top surface 40 of the unloading station 28, toward the bagging station 48 for dispensing directly into a bag or to be received by a bagger, cashier, or customer, and the like.

Figure 6:
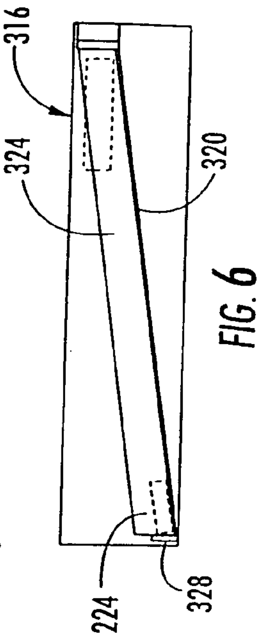
FIG. 6 is a rear elevational detail view of the apparatus illustrated in FIG. 5.
Figure 5:
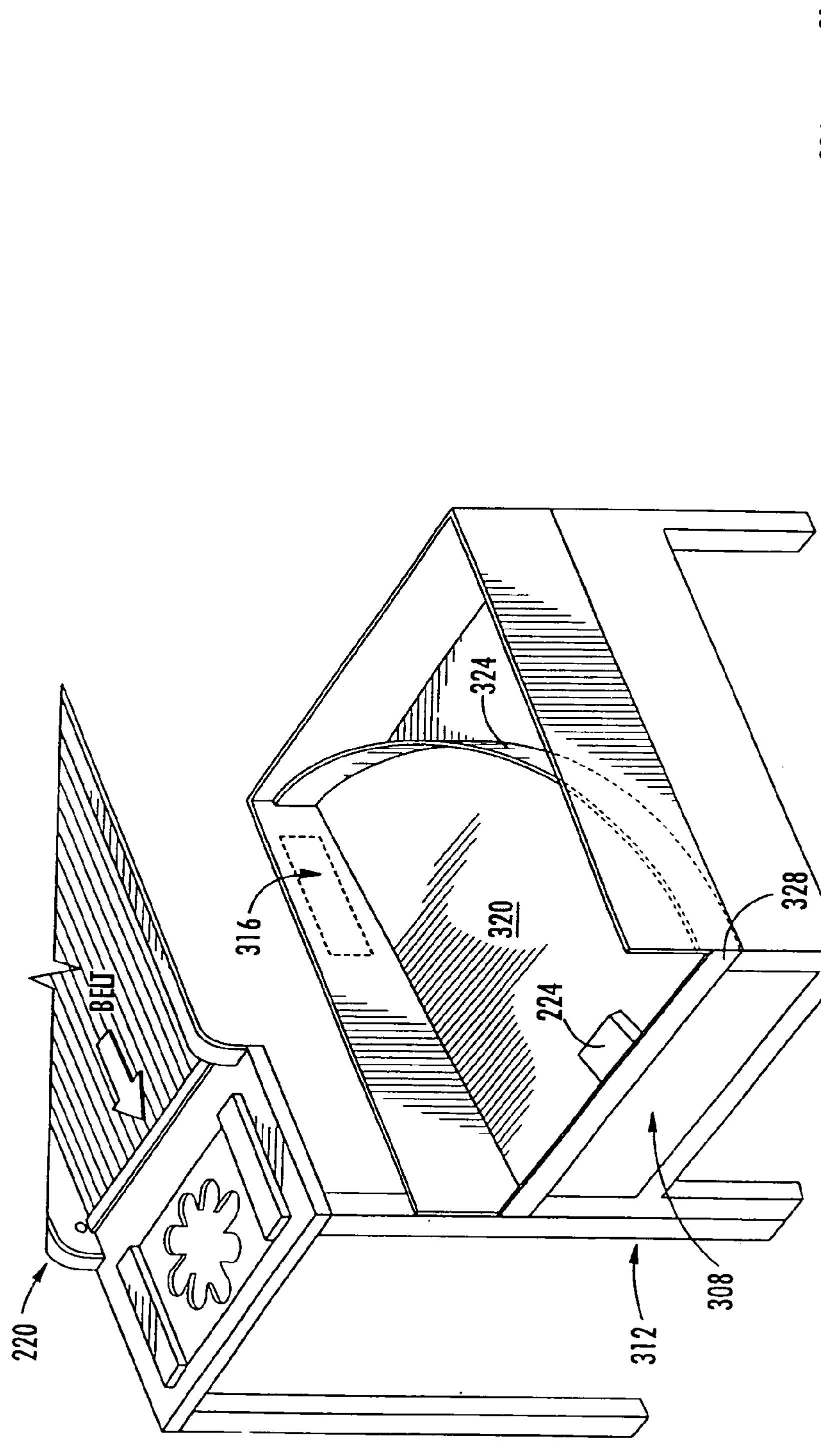
FIG. 5 is a rear perspective detail view of an apparatus according to an alternative embodiment of the present invention.
Figure 7:
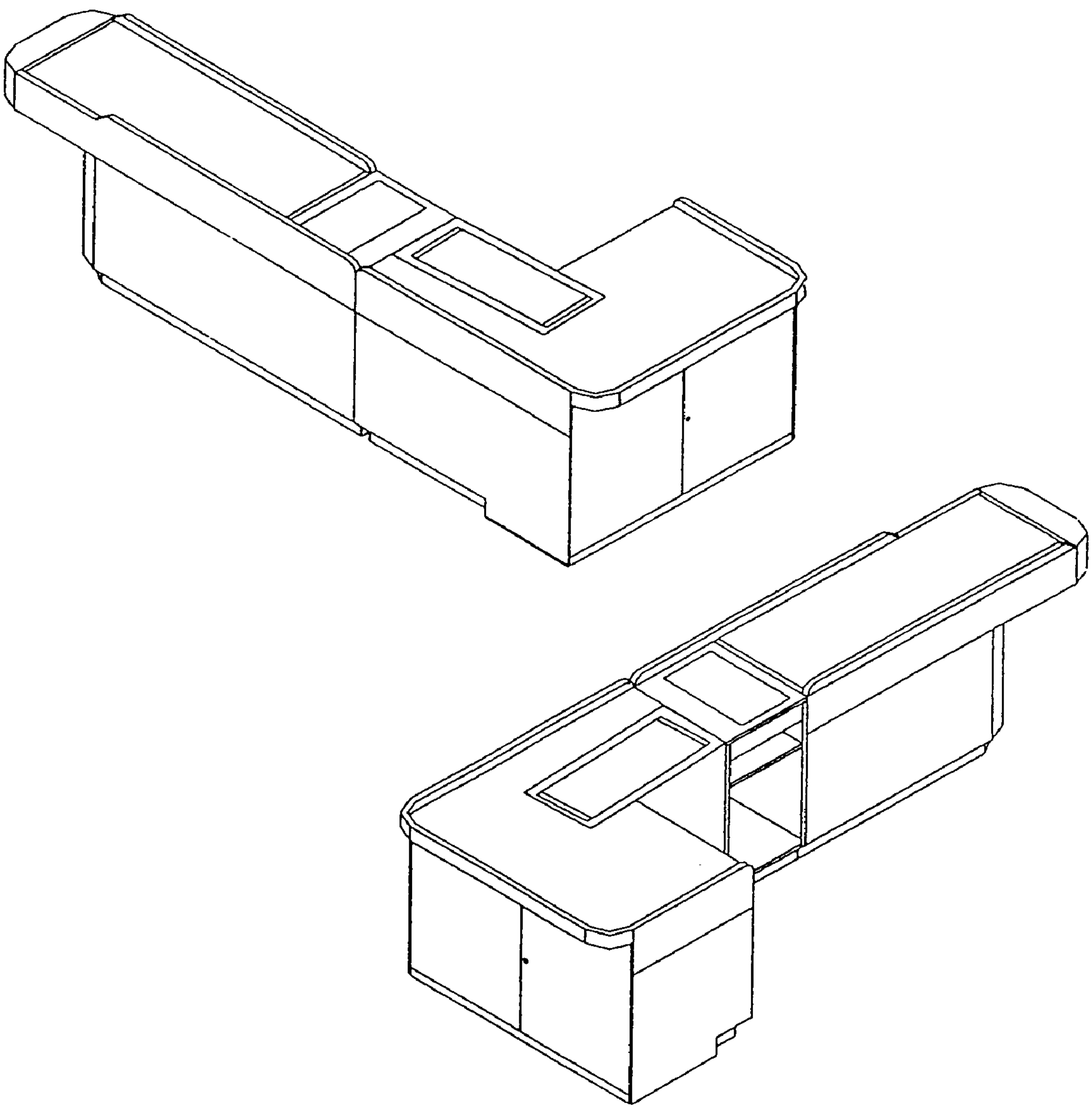
FIGS. 7–23 are views of various check-out counters having an under-counter storage and dispensing apparatus according to preferred embodiments of the present invention.
Figure 8:
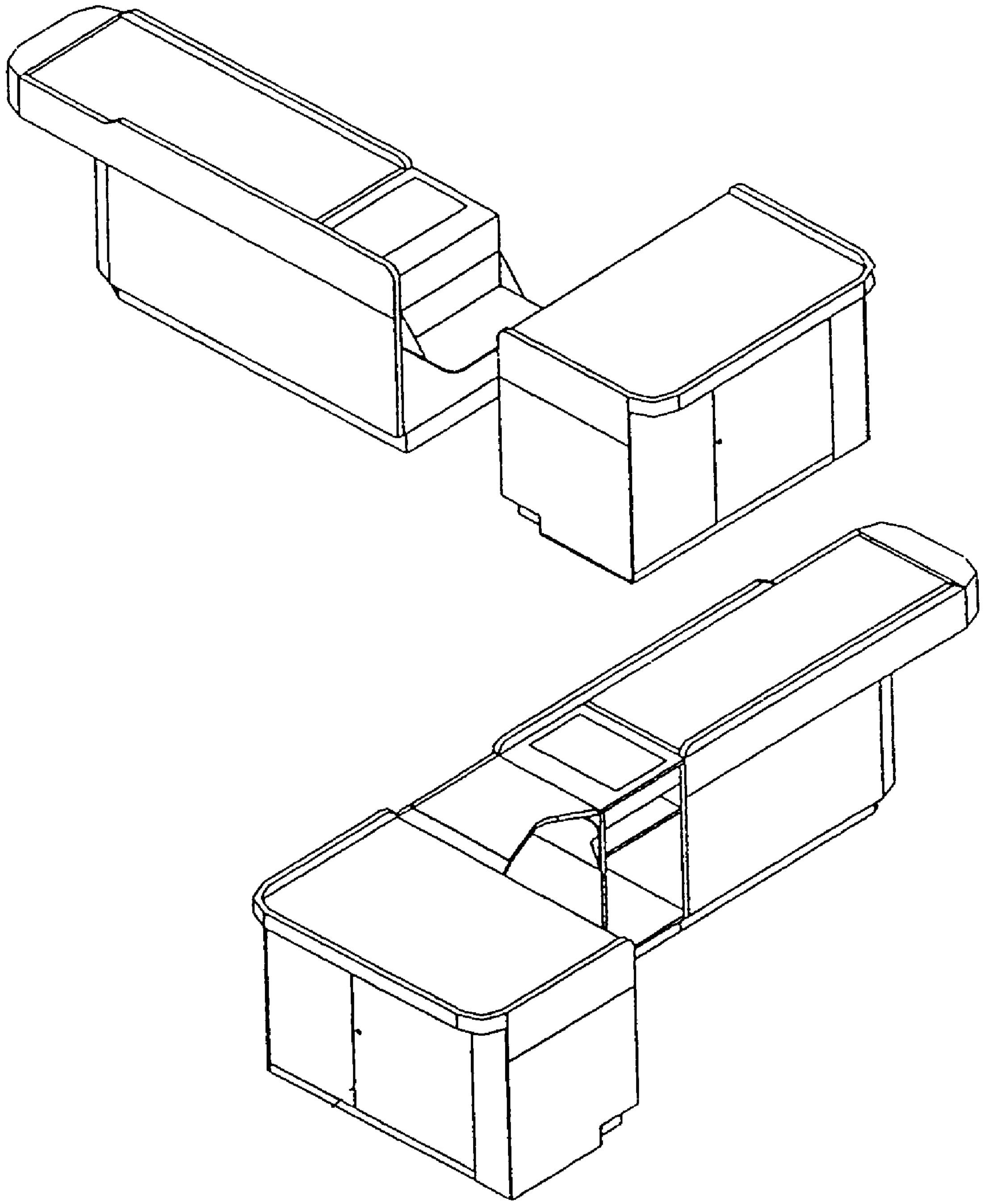
Figure 9:
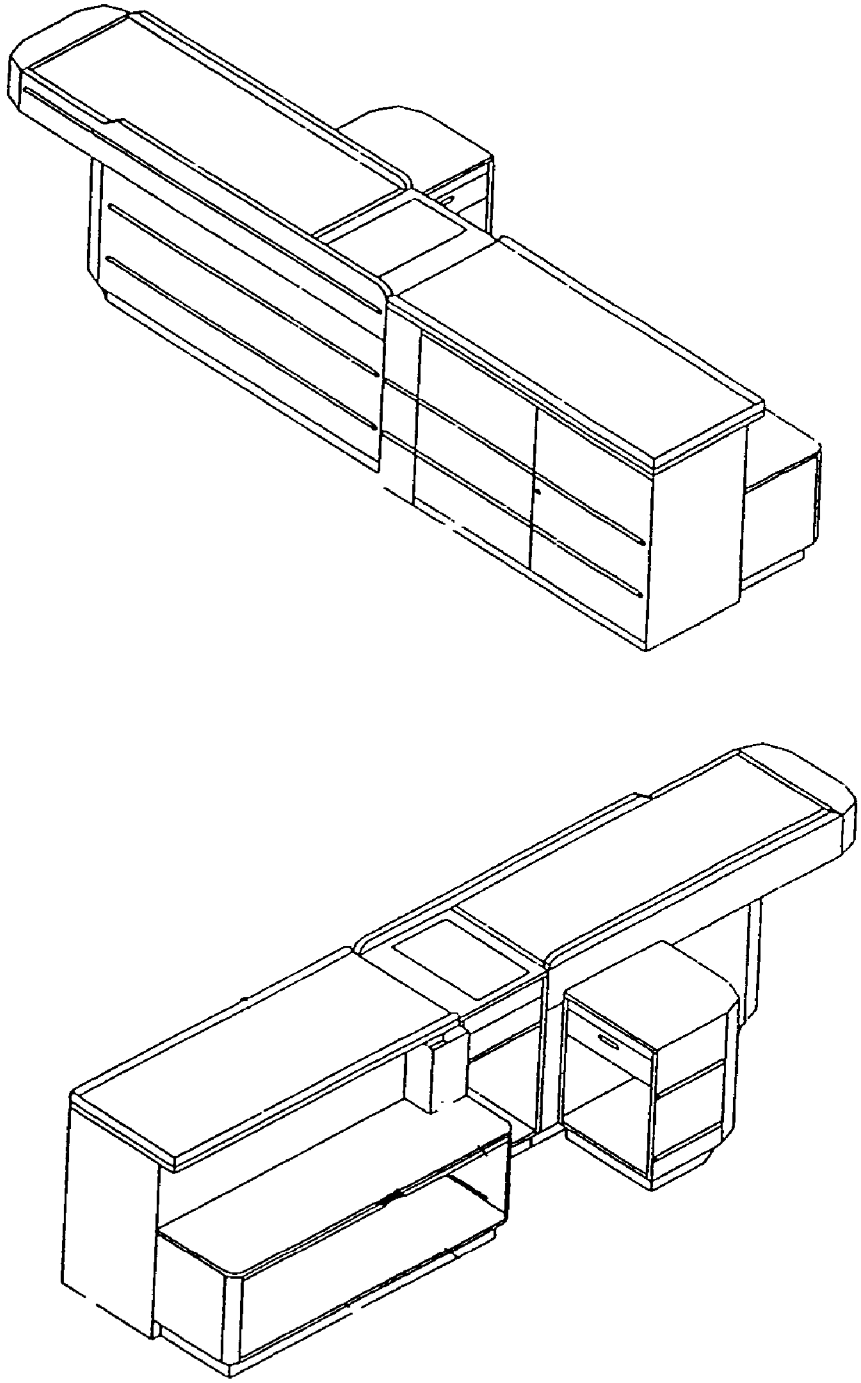
Figure 10:
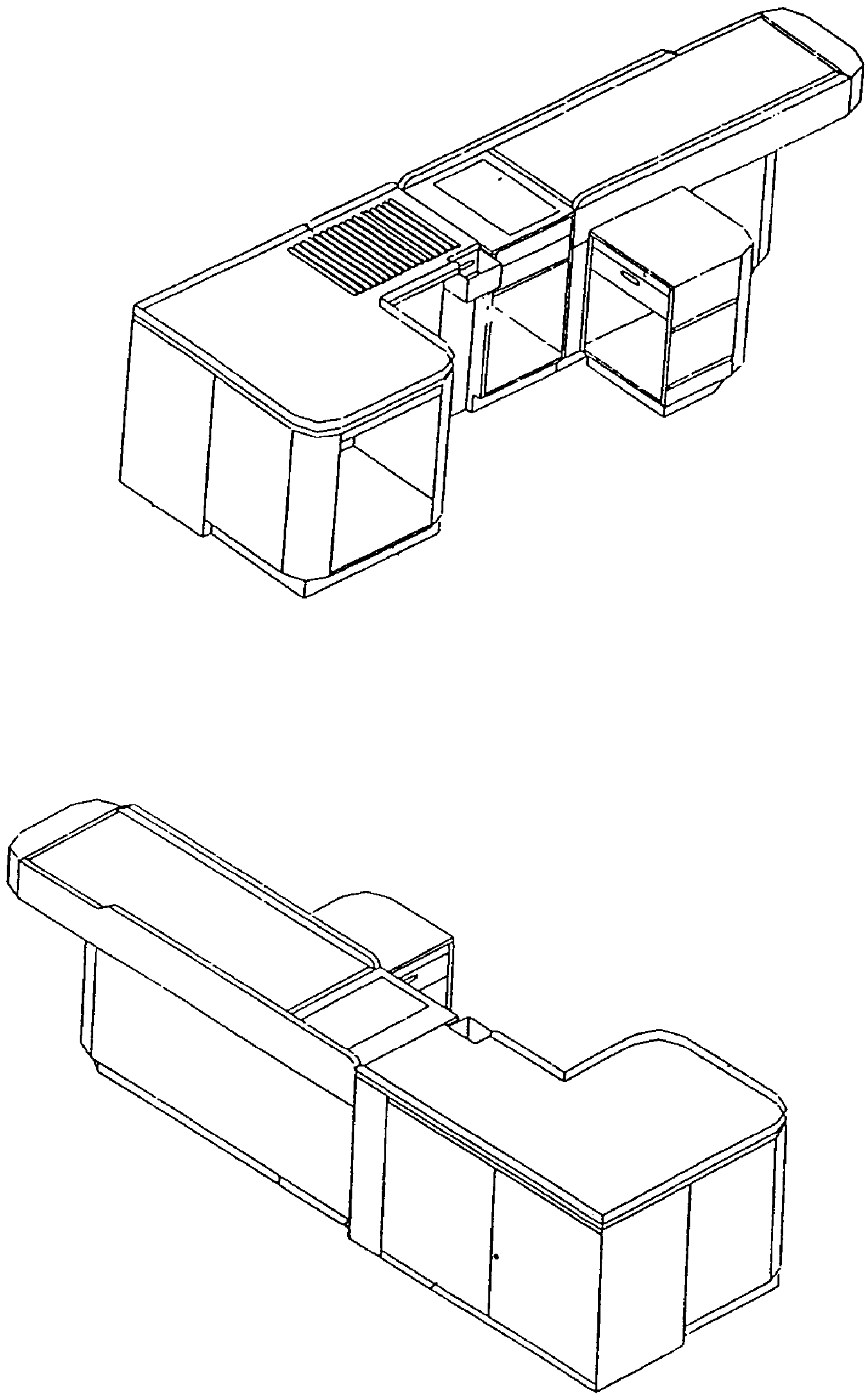
Figure 11:
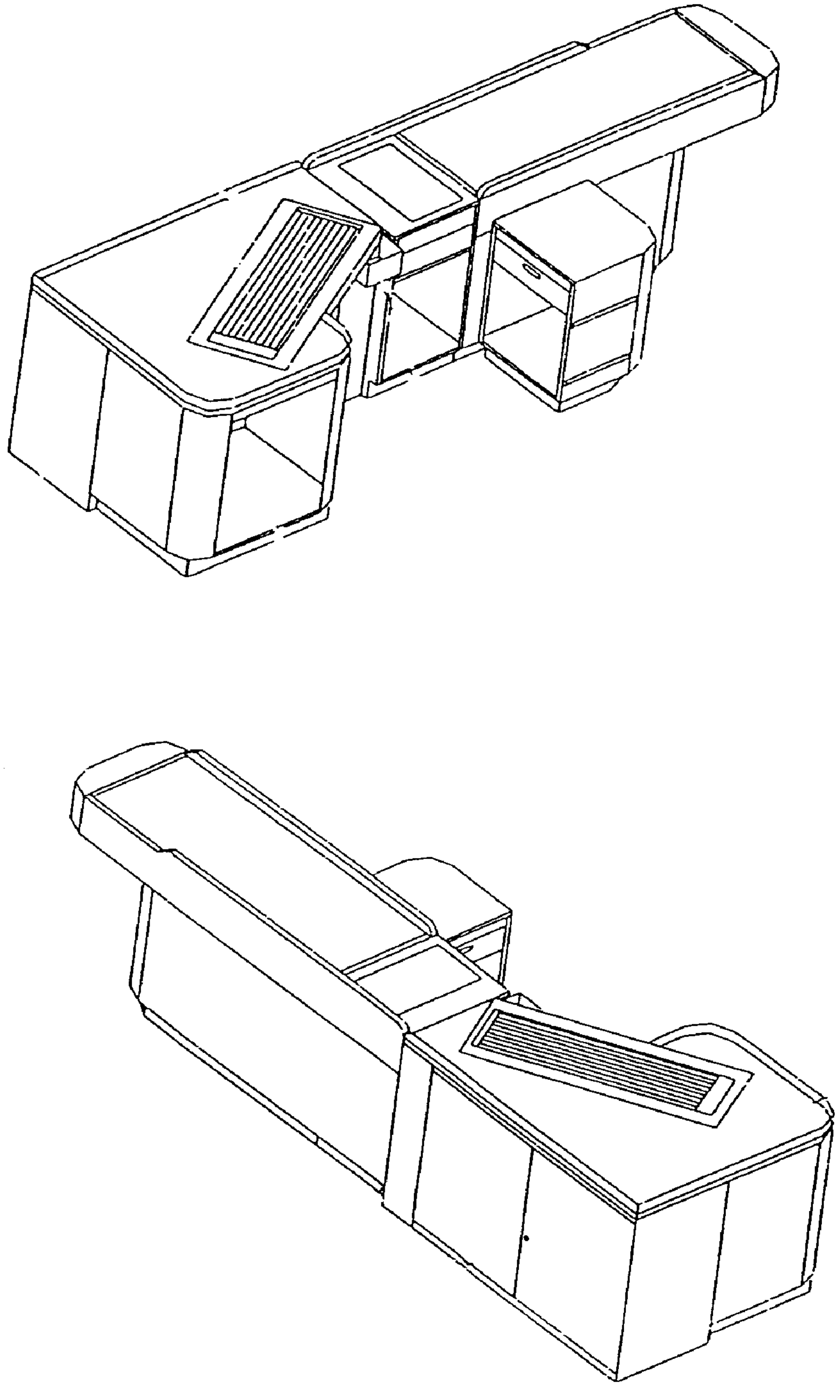
Figure 12:
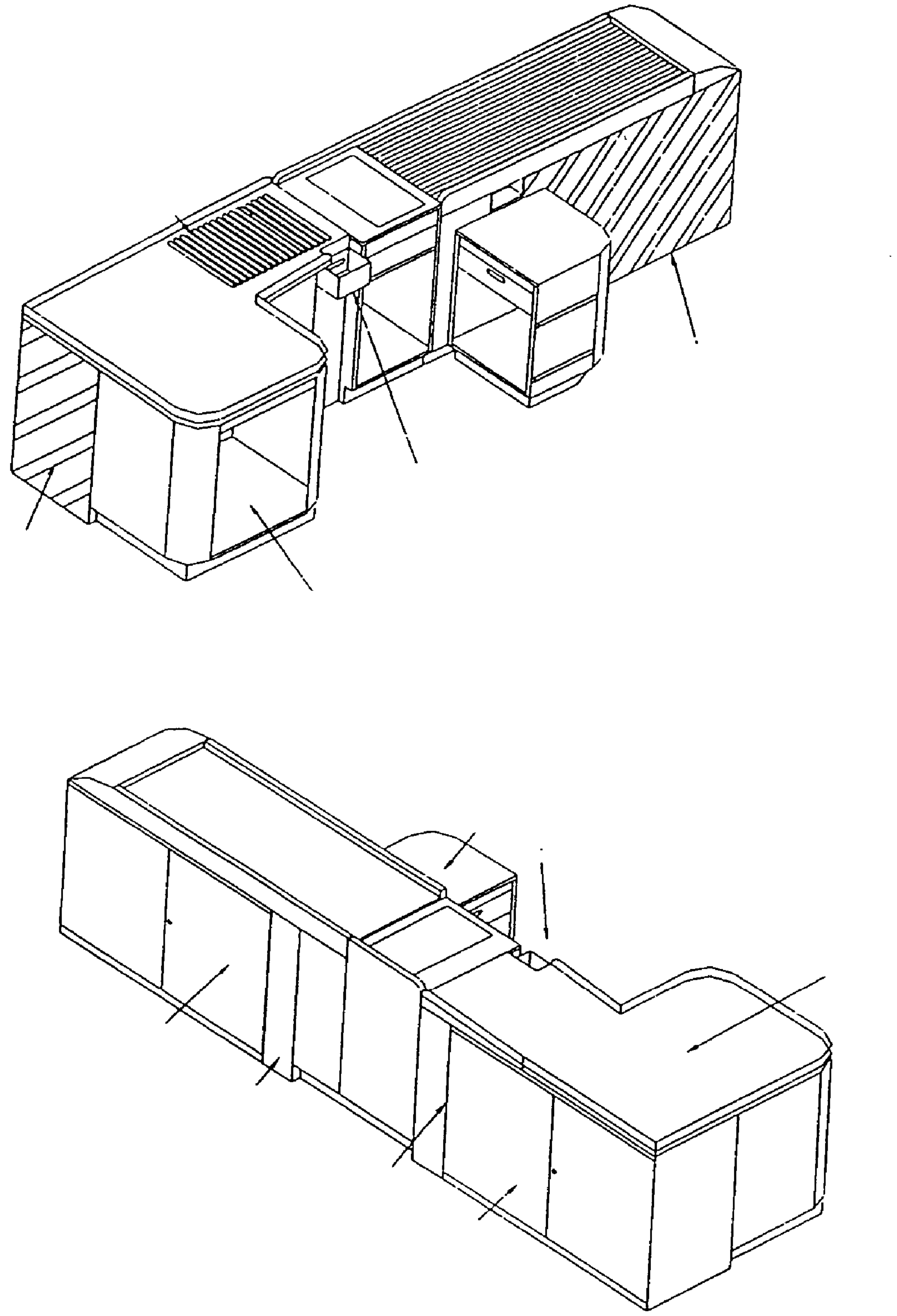
Figure 13:
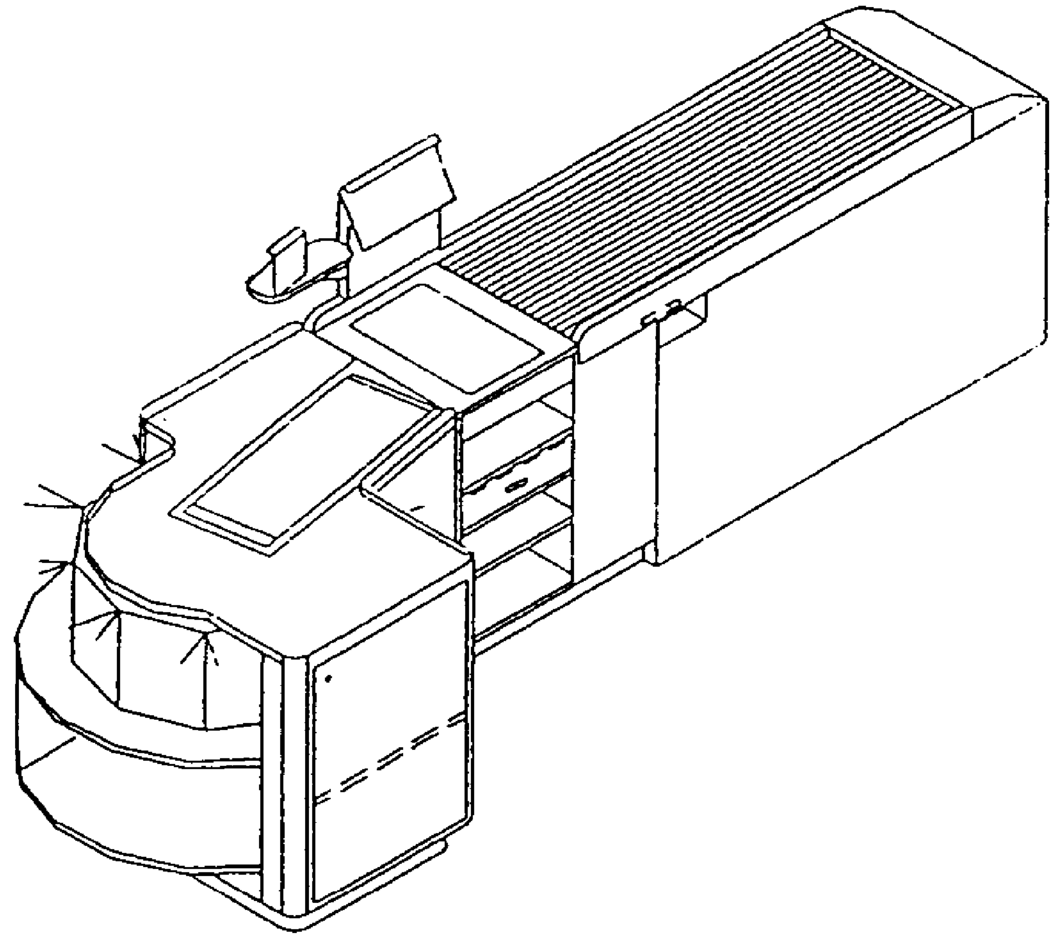
Figure 14:
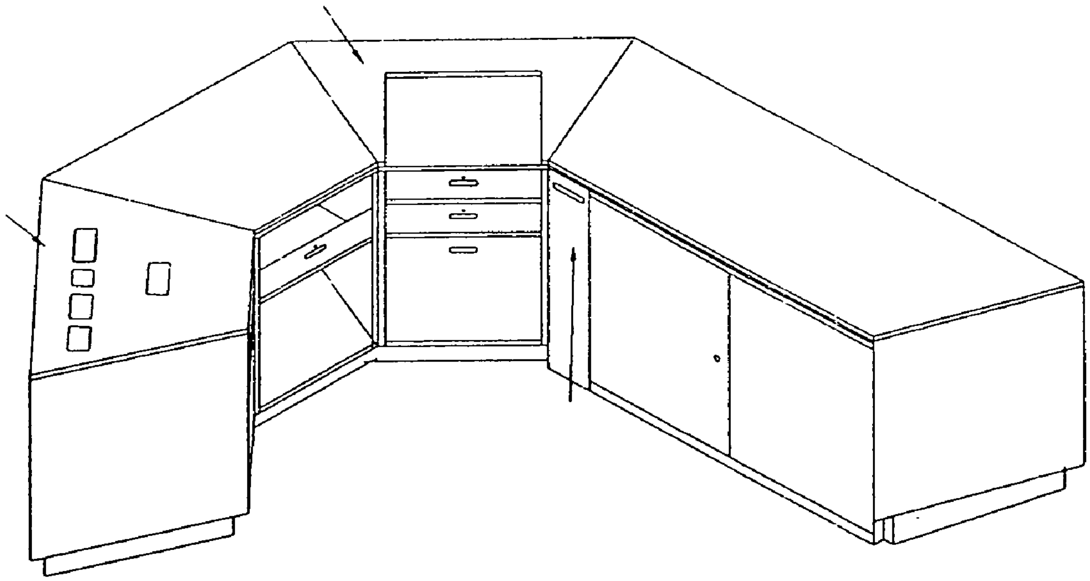
Figure 15:
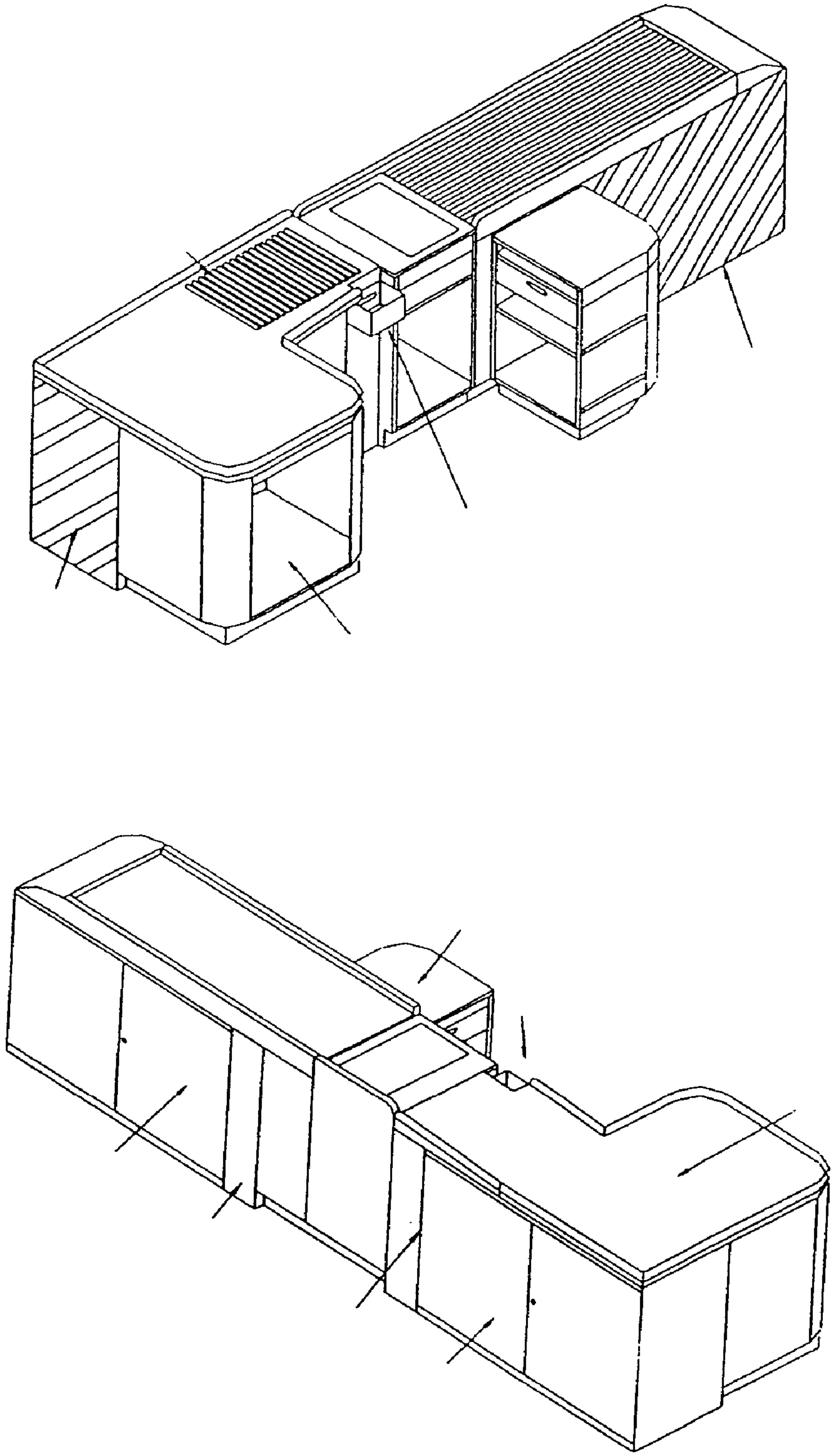
Figure 16:
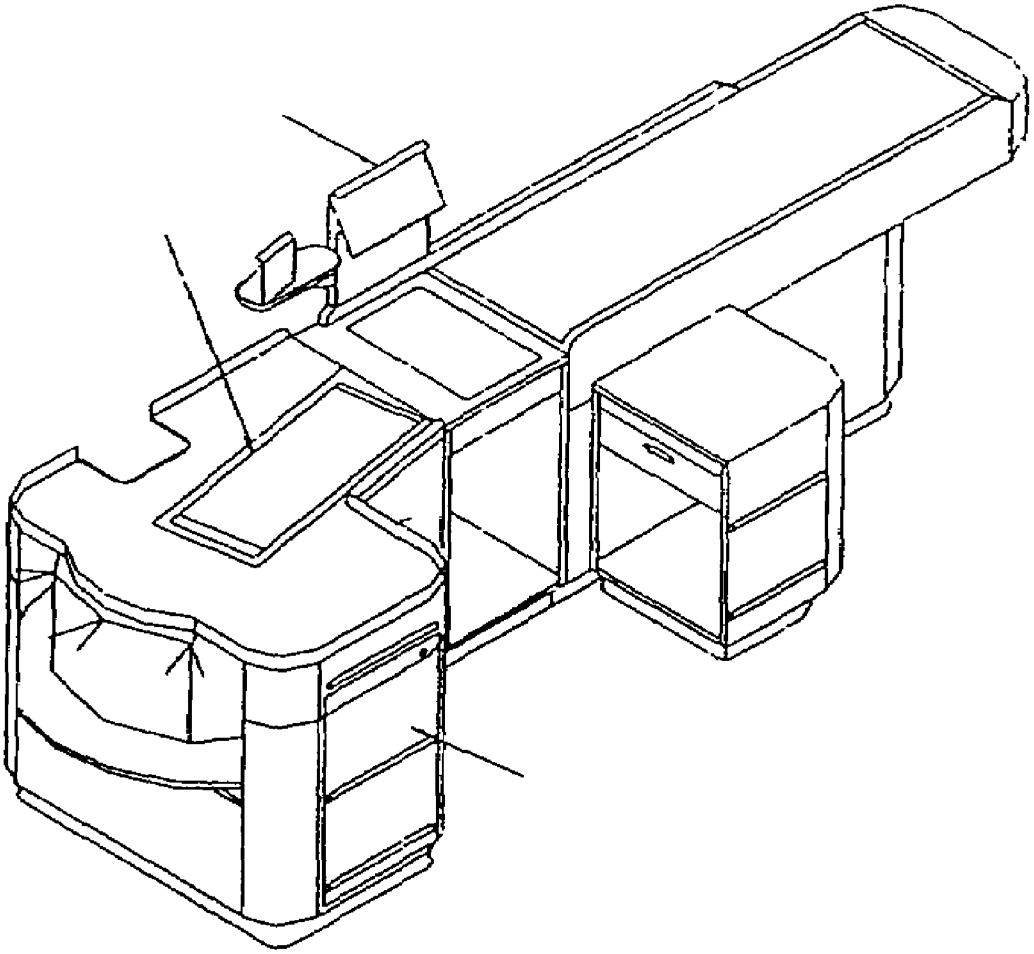
Figure 17:
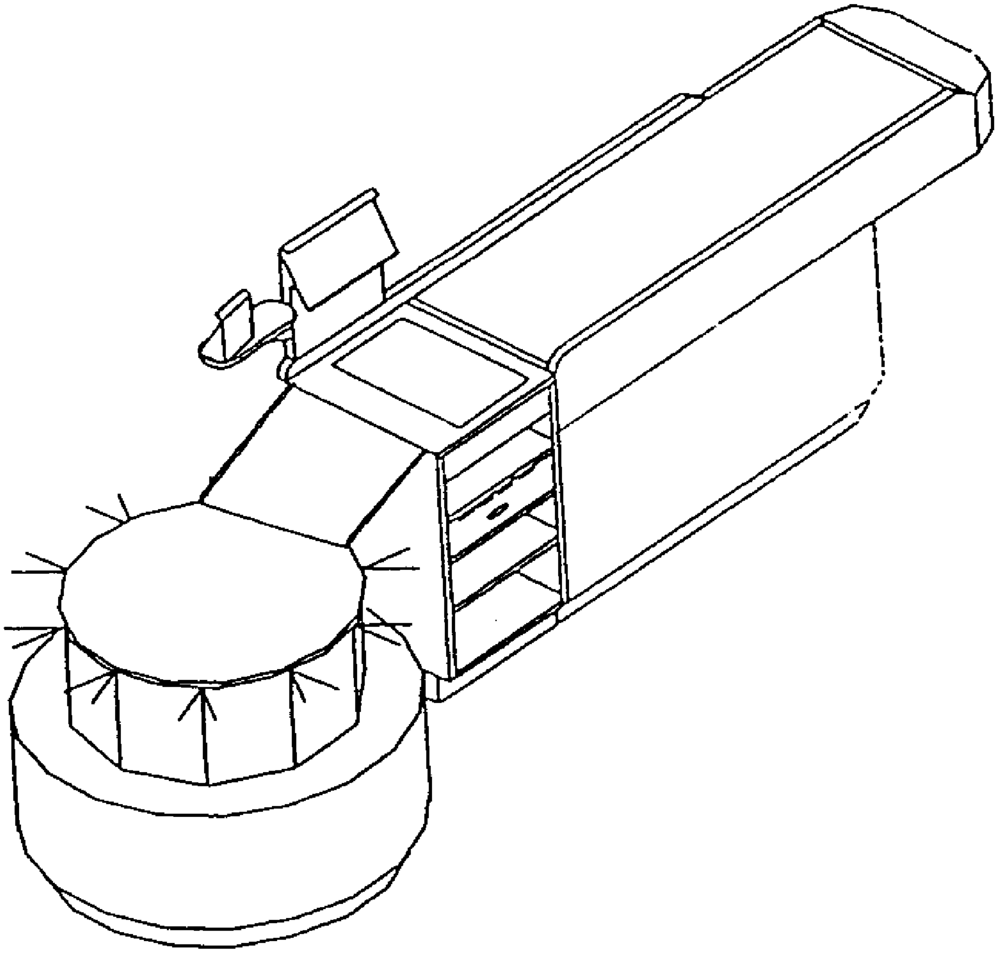
Figure 18:
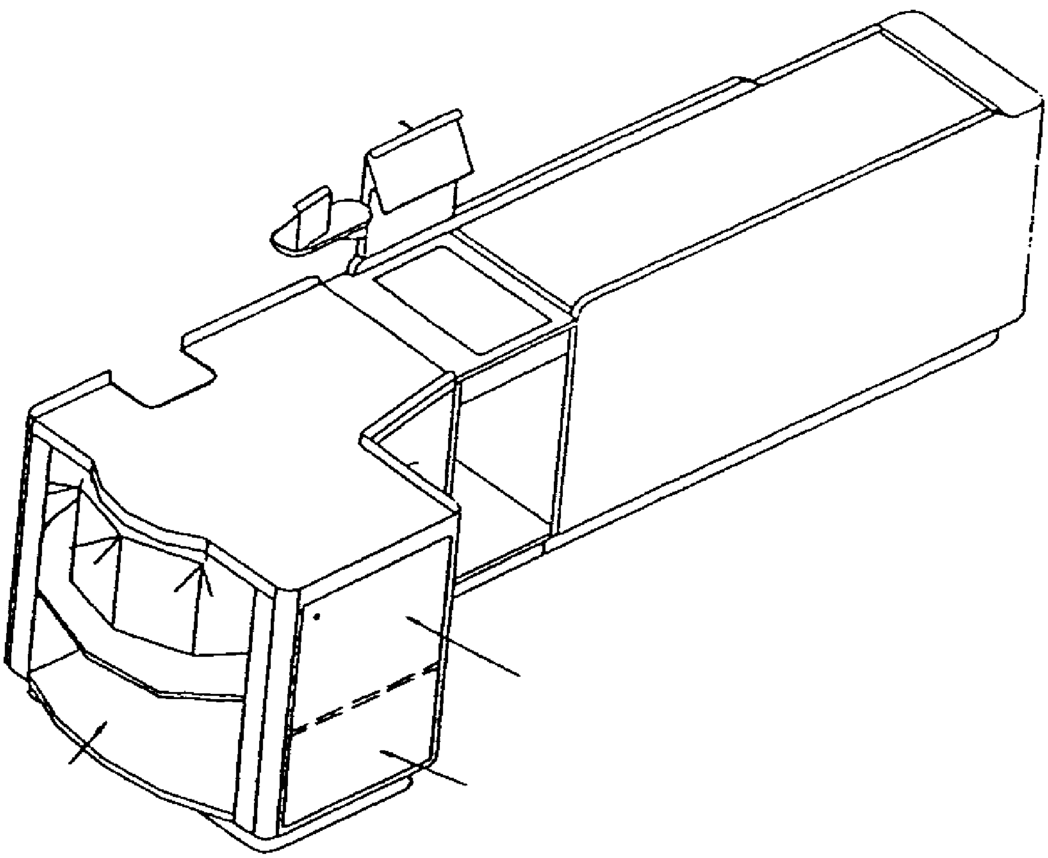
Figure 19:
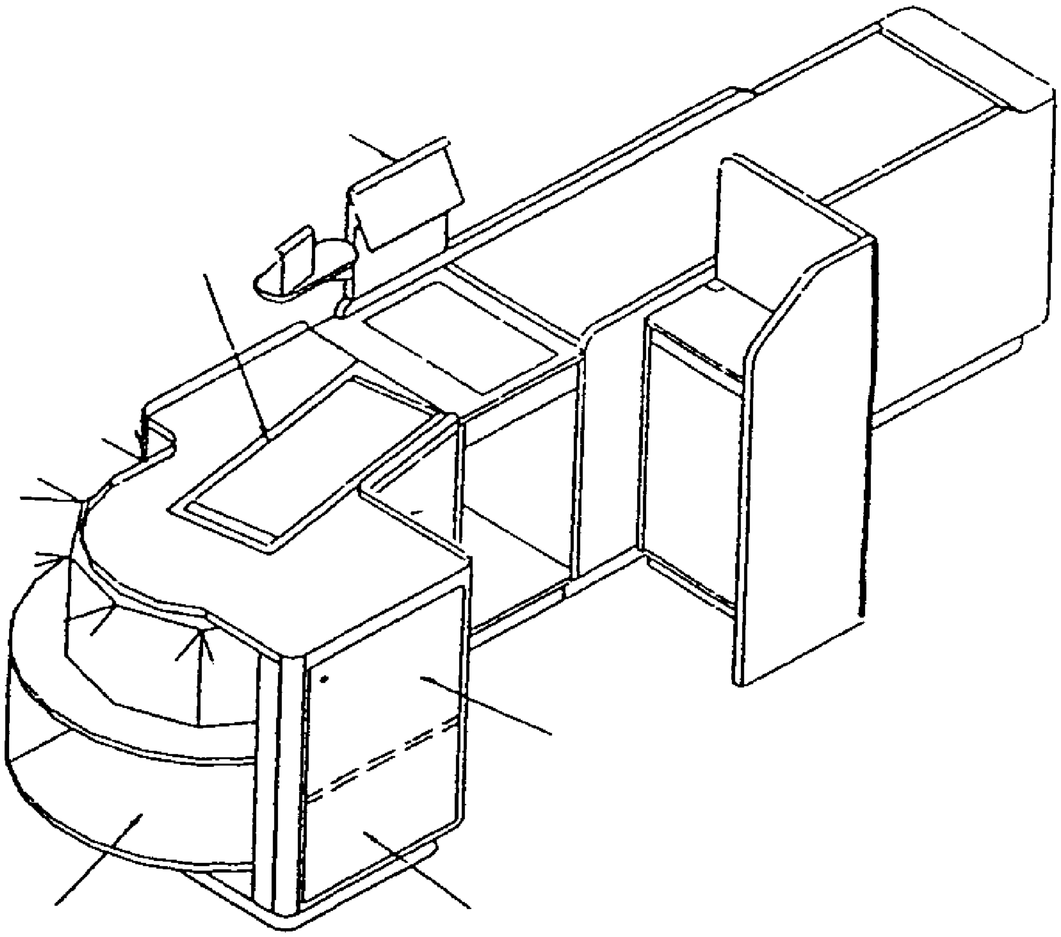
Figure 20:
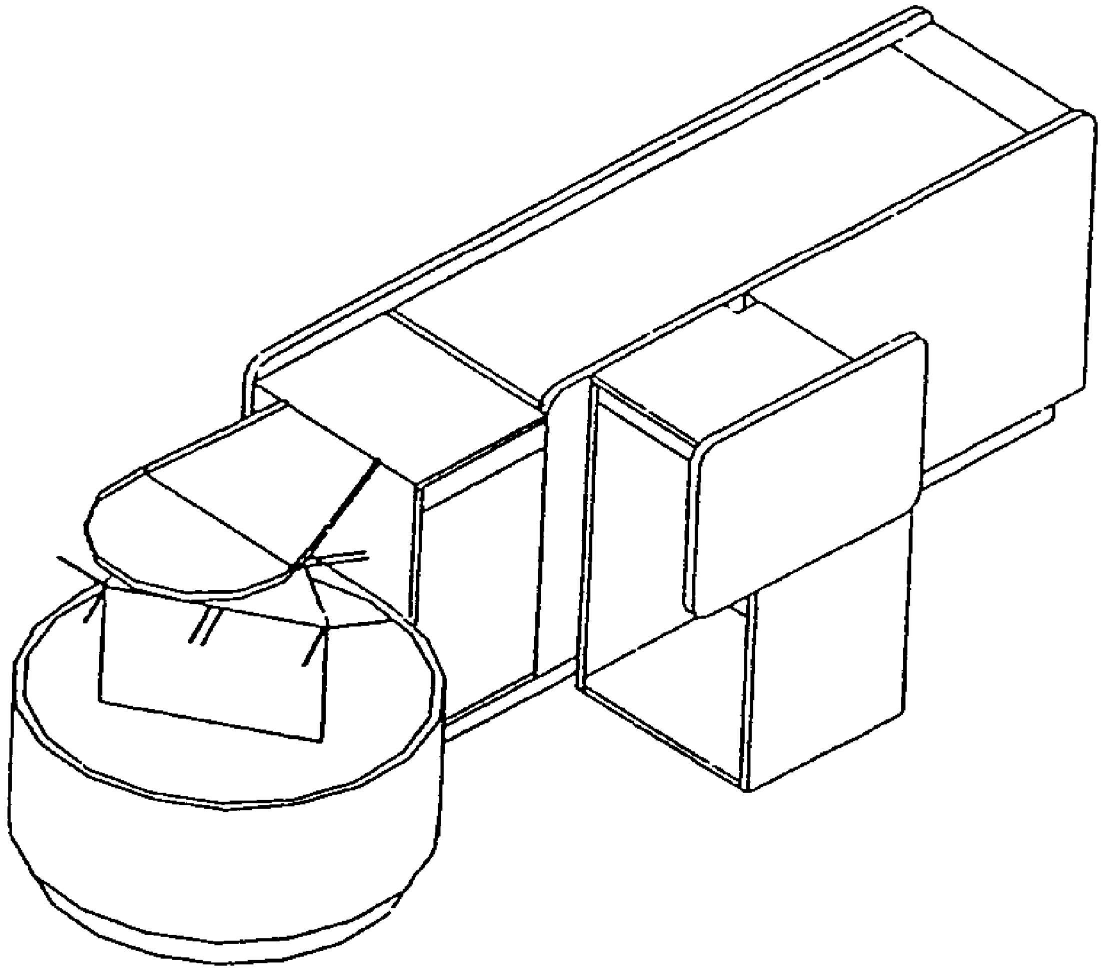
Figure 21:
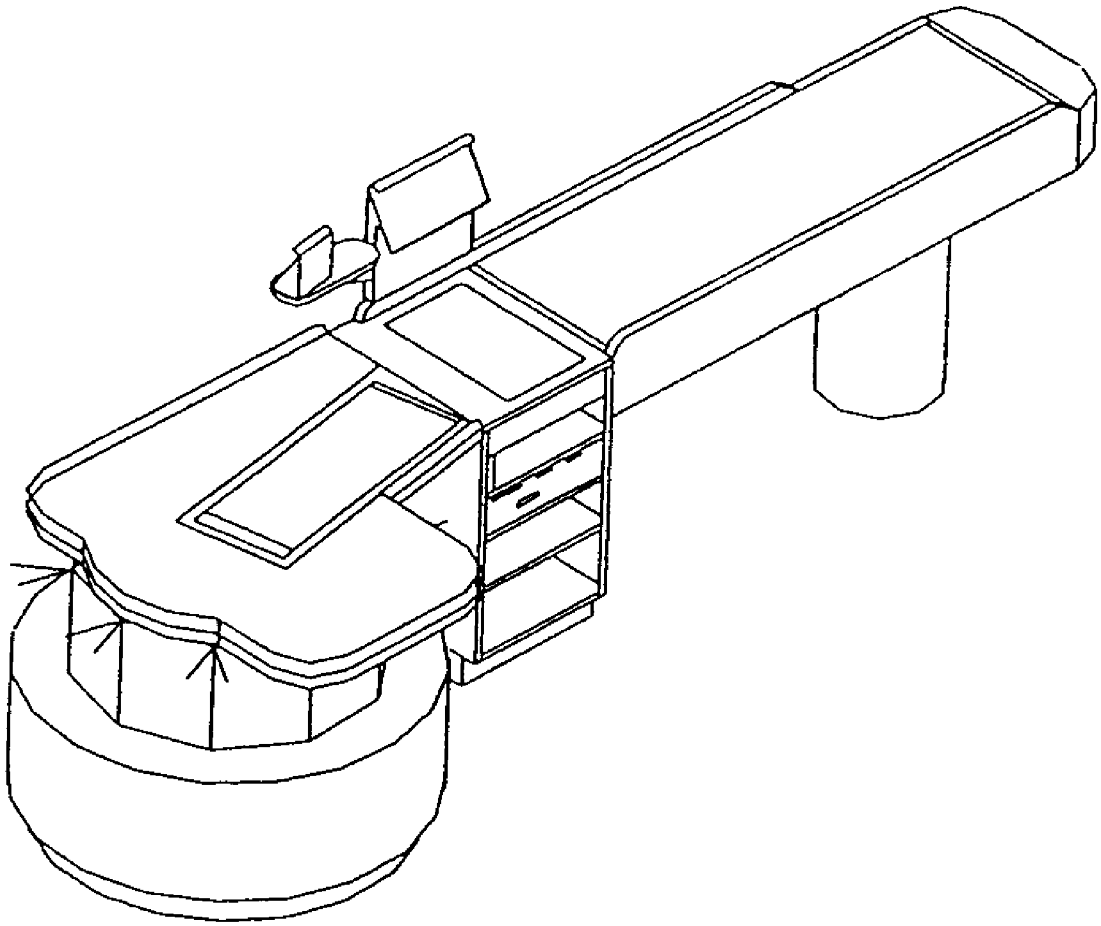
Figure 22:
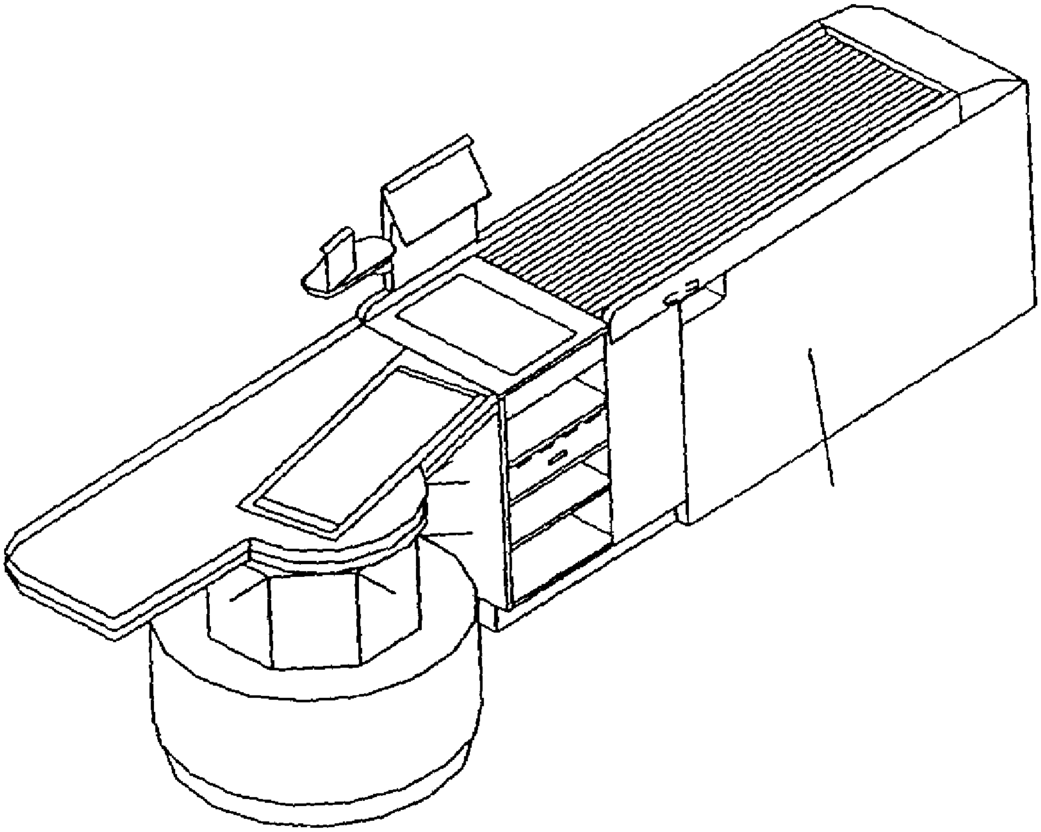
Figure 23:
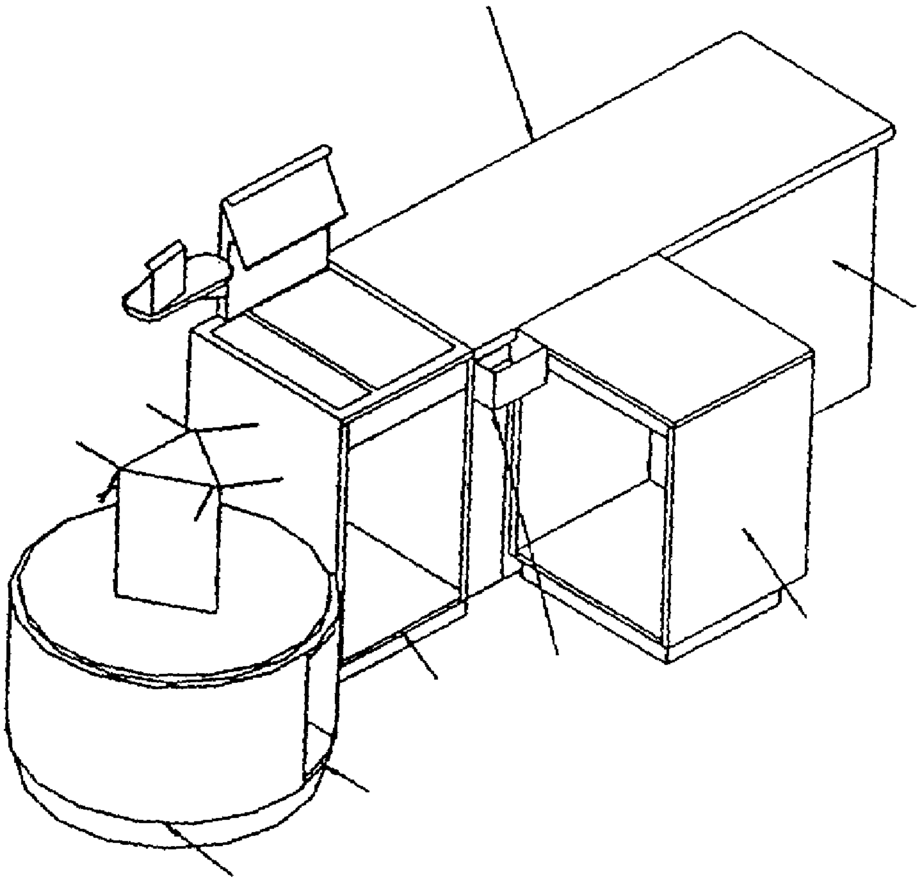

In some preferred embodiments such as that shown in FIGS. 5 and 6, the dispenser opening 308 is located in a cash register stand. For example, the dispenser opening 308 can be in a front panel of a stand 312 that supports a cash register or computer upon a top shelf or surface (not shown). The cash register stand 312 illustrated in FIGS. 5 and 6 includes an ejector opening 316, through which cigarette packages 224 are dispensed from the storage and dispensing device 268. The ejector opening 316 is positioned toward a rear of the stand 312, although the ejector opening 316 can be located in any wall of the stand 312 depending at least partially upon the positional relationship of the stand 312 and the storage and dispensing device 268.

Although the cash register stand 312 can have a substantially flat surface upon which cigarette packages 224 are dispensed, the stand 312 more preferably includes an angled slide 320 down which cigarette packages 224 slide after being dispensed upon the stand 312. In the illustrated preferred embodiment for example, the slide 320 has a rear portion elevated above a front portion so that gravity biases cigarette packages 224 from the rear portion toward the front portion. In some embodiments, the stand 312 has one or more guide walls 324 which can be curved, angled, or otherwise shaped to direct cigarette packages 224 to a location where they are more accessible to a cashier. Preferably, the stand has a slide 320 and one or more guide walls 324 which collectively work to transfer the cigarette packages 224 toward a cashier-accessible location (e.g., at a front side of the stand 312). If desired, the stand 312 can also have a stop 328 positioned to prevent dispensed cigarette packages 224 from falling to the ground.

Although the illustrated embodiments each have a single dispenser opening 108, 308 the storage and dispensing device 68, 268 can have a plurality of dispenser openings 108, 308 positioned in a variety of locations on the check-out counter 20, 220 (including any of the location described above). The storage and dispensing device 68, 268 can have any number of dispenser openings 108, 308 corresponding to the number of storage and dispensing devices 68, 268 used per check-out counter 20, 220, and can have a plurality of dispenser openings 108, 308 for a single storage and dispensing device 68, 268. Furthermore, the storage and dispensing device 68, 268 can be controlled to dispense cigarette packages 24, 224 to any of a plurality of dispenser openings 108, 308.

With reference to the first preferred embodiment illustrated in FIGS. 1–4, the storage and dispensing device 68 preferably also includes a disabling and monitoring system 132 that has an unlocked state in which the storage and dispensing device 68 can dispense cigarette packages 24, and a locked state in which the storage and dispensing device 68 is disabled from dispensing cigarette packages 24. In the unlocked state, a user (e.g., a customer) can depress one or more of the buttons 100 on the control panel 96 to dispense cigarette packages 24 as described above. In the locked condition, the storage and dispensing device 68 will not dispense cigarette packages 24 despite commands from the user via the control panel 96. The disabling and monitoring system 132 preferably includes a dedicated controller or is connected to the controller (not shown) of the storage and dispensing device 68.

The disabling and monitoring system can take a number of different forms, and preferably includes at least one user-manipulatable control which can be operated to enable and disable the control panel 96 (or at least one button or control on the control panel 96 to thereby enable and disable dispensing operations by the storage and dispensing device 68). The user-manipulatable control is preferably at least one button, and more preferably is a keypad 136 that can be operated to enable and disable the storage and dispensing device 68. However, the disabling and monitoring system 132 can have user-manipulatable controls in any of the forms described above with reference to the control panel 96.

The disabling and monitoring system 132 can be used by a cashier in order to prevent the storage and dispensing device 68 from dispensing cigarette packages 24 while children (or any other individual) is in line, to disable the storage and dispensing device 68 when the retail outlet is closed, on certain days or times of day, and the like. The keypad 136 can be positioned in any location with respect to the check-out counter 20, and is preferably located for easy access by the cashier.

In some embodiments, the disabling and monitoring system 132 has monitoring features that provide statistics regarding cigarette packages dispensed from the storage and dispensing device 68. The statistics can include the number of cigarette packages 24 dispensed, brands or types of cigarette packages 24 dispensed, the number of cigarette packages 24, brands, or types of cigarette packages 24 remaining in the door and interior columns 84, 92, the time and/or date at which cigarette packages are dispensed (e.g., a logged history of dispensing device activity), the monetary value of cigarette packages dispensed from and/or remaining in the storage and dispensing device 68, and the like.

The illustrated preferred embodiments described above have been described with relation to the storage and dispensing of cigarette packages 24 from a storage and dispensing device 68 located at least partially beneath a check-out counter 20. However, it should be noted that the present invention can be employed for dispensing any packaged or unpackaged product desired. By way of example only, the storage and dispensing device 68 of the present invention can be employed to store and dispense chewing tobacco, cigar packages, candy, gum, video tapes, DVDs, compact disks, cosmetics, cassette tapes, magazines, lottery tickets, batteries, film, prophylactics, medications, over the counter drugs, prescription drugs, or any impulse or other type of item found in a convenience store or a grocery store.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example (and as described in greater detail above), instead of dispensing the cigarette packages toward a cashier or cashier station, cigarette packages can be dispensed toward a variety of positions, therefore giving the retail outlet greater freedom to accommodate the device to particular needs and preferences. As another example (and as also described above) the storage and dispensing device can be located beneath any portion or station of the check-out counter desired, and in some embodiments can be positioned beneath more than one station of the check-out counter.

The invention claimed is:

1. A product storage and dispensing system for dispensing retail product at cheek-out counters, the system comprising:

- a check-out counter having space defined thereunder and having a conveyor for moving product from an unloading station to a bagging station;
- a customer interface with user manipulatable controls for selection of a retail product to be dispensed from a list of retail products;
- two or more storage devices located in the space under the check-out counter for storing retail products corresponding to the list of retail products, at least one of the storage devices being located below the unloading station and at least one of the storage devices being located below the bagging station:
- two or more dispensing devices for transferring the retail products corresponding to the list of retail products from the storage devices to a position above or beside the check-out counter in response to selection of the one or more of the retail products by the customer via the customer interface; and
- a disabling and monitoring system operatively associated with the dispensing devices or the customer interface for monitoring statistical information associated with the dispensed retail products and for selectively enabling or disabling operation of the dispensing devices.

2. The system of claim 1, wherein one of the storage devices and one of the dispensing devices is located below the unloading station, and the other one of the storage devices and the other one of the dispensing devices is located below the bagging station.

* * * * *